United States Patent
Ohnishi et al.

(10) Patent No.: US 6,676,868 B2
(45) Date of Patent: Jan. 13, 2004

(54) METHOD OF MANUFACTURING A SEPARATOR FOR A POLYMER ELECTROLYTE FUEL CELL

(75) Inventors: Hideki Ohnishi, Hokkaido (JP); Ryuichi Saito, Hokkaido (JP)

(73) Assignee: Dynax Corporation, Hokkaido (JP)

( * ) Notice: Subject to any disclaimer, the term of this patent is extended or adjusted under 35 U.S.C. 154(b) by 0 days.

(21) Appl. No.: 10/183,219

(22) Filed: Jun. 26, 2002

(65) Prior Publication Data

US 2003/0137074 A1 Jul. 24, 2003

(30) Foreign Application Priority Data

Jan. 21, 2002 (JP) ......................... 2002-011730

(51) Int. Cl.[7] .................. B29B 11/00; B29C 35/00
(52) U.S. Cl. .................. 264/113; 264/112; 264/126; 264/271.1; 264/275; 264/279; 419/8; 419/11
(58) Field of Search .................. 264/109–128, 264/271.1, 275, 279; 419/8, 11

(56) References Cited

U.S. PATENT DOCUMENTS 5,217,822 A * 6/1993 Yoshida et al. ................ 429/33

* cited by examiner

Primary Examiner—Stephen J. Lechert, Jr.
(74) Attorney, Agent, or Firm—John S Munday

(57) ABSTRACT

A method of manufacturing a separator for a polymer electrolyte fuel cell in which the specific resistance is small, and the coefficient of thermal conductivity and the gas shielding property are high and have high strength. The sintering material comprises a phenol resin coated to the surface of a powder of carbon, and the plate is a metallic plate having plating on both surfaces. After the metallic plate is arranged in a mold provided with grooves, the sintering material is filled to both sides of the metallic plate, and then they are heated and sintered. The separator for a fuel cell becomes homogeneous, and, as a result, the gas shielding property rises with high strength, because phenol resin has been uniformly distributed in the sintering material. Moreover, because oxides are not generated on the surfaces of the separator by sintering, the specific resistance will be relatively small.

8 Claims, 3 Drawing Sheets

METHOD OF MANUFACTURING A SEPARATOR FOR A POLYMER ELECTROLYTE FUEL CELL

FIELD OF THE INVENTION

This invention relates to polymer electrolyte fuel cells. More particularly, the invention relates to a method of manufacturing a separator built in a cell of a polymer electrolyte fuel cell.

BACKGROUND OF THE INVENTION

A polymer electrolyte fuel cell (hereafter called a "fuel cell") is an apparatus for power generation by supplying a reactant gas (hydrogen and oxygen) to an electrode which comprises a polymer electrolyte membrane. FIG. 3 is a perspective view of typical a cell C which is a minimum unit composing such a fuel cell. The cell C of a fuel cell comprises electrodes E1 and E2 (anode and cathode) which comprise a catalytic layer and a porous supporting layer, an electrolyte D inserted between the electrodes E1 and E2, and separators 100 disposed outside the electrodes E1, E2. Because as low as the voltage of 1 volt or less is obtainable on one cell C of the above-mentioned composition, practically speaking, tens to hundreds of those cells C are usually accumulated in series to form an actual fuel cell.

FIG. 4 is a front elevation of a conventional separator 100 used in a fuel cell. A number of grooves 120 of about 0.5–2.0 mm in width and depth are formed as shown in FIG. 4 on both sides of a plate-shaped separator 100. Those grooves 120 function as passages of the reactant gas and as exhaust passages of water generated as result of the reaction. In a fuel cell composed by a number of cells C accumulated as above, said separators 100 not only function as partitions of those cells C, but also function to supply the reactant gas to the adjacent electrode E1 (or E2) through the grooves 120 or to exhaust outside the water generated with the reaction. Moreover, the separators 100 play the role to transmit the electricity generated in the cells C outside. Therefore, in the separators 100 of a fuel cell, it is required that the gas shielding property be high so that the reactant gas supplied to the electrodes E1 and E2 (anode side and cathode side) should not mix with each other. Moreover, it is necessary to have excellent corrosion resistance and oxidation resistance so that it is never corroded with the reactant gas. In addition, it is also necessary for the fuel cell to be light, and to have the electrical conduction property. In addition, it is necessary that the separators have sufficient strength to bear the weight of the accumulated cells C.

At the same time, in order to minimize a fuel cell, it is necessary to make the thickness of the separator as thin as possible. An isotropic carbon is used as a material of the separator C which meets the above-mentioned requirements.

As shown in FIG. 5 schematically, in order to make a separator C by using an isotropic carbon, the following steps are performed; namely, firstly, a carbon material R is heated and sintered at 2000° C. or more in an electric furnace (see FIG. 5(*a*)); secondly, it is cut out in the form of a plate (see FIG. 5(*b*)); and then grooves are mechanically formed with an end mill, etc. (see FIG. 5(*c*)). However, isotropic carbon after sintering is very hard and brittle, and consequently, there is a problem in the present art that carrying out the cutting and formation of grooves is too time-consuming.

Thus, there is another method in which the sintering material is prepared by mixing carbon powder with granulated phenol resin functioning as a binder, which material is charged into a mold formed with grooves. The components are sintered with a hot plate pressing. According to this method, it is advantageous that the sintering of the carbon powder and the formation of grooves may be accomplished simultaneously. However, in case of this method, because water is generated from phenol resin during the process of heating and sintering, bubbles which originate in water are inevitably formed in the carbon material after the sintering, thereby impairing the gas shielding property. Accordingly, in this method, there is a problem of having to give a processing of blocking the bubbles after the sintering, which again is very time-consuming.

There is still another method in which a metallic plate is arranged in a mold which is provided with grooves, and thereafter a sintering material comprising carbon powder and granulated phenol resin is charged thereinto. The components are sintered by a hot plate pressing, thereby integrating the metallic plate with the carbon material. A separator manufactured by this method has a structure in which the metallic plate is sandwiched by the carbon materials. Therefore, even if bubbles originating in the phenol resin in the carbon material are generated after the sintering, the obverse side and the reverse side of the separator are not communicable owing to the metallic plate installed in the center, thereby maintaining the gas shielding property as a whole.

However, in case of the prior art methods, there is a problem of generating oxides with a low electrical conduction property on the surfaces of the carbon material after the sintering depending upon the kinds of the metallic plate. Due to the difference in the coefficient of thermal expansion of the metallic plate and the carbon powder, there is a second problem in that the bonding strength in the interface of the metallic plate and the carbon material is rather weak, thereby giving rise to a premature separation.

In addition, because the sintering material is a mixture of the carbon powder and the granulated phenol resin, the composition tends to become ununiform. It is therefore necessary to add the granulated phenol resin in more than the necessary amount as a binder. Consequently, a number of bubbles which come from the phenol resin are generated. Also, the thickness of the carbon material after the sintering tends to be relatively large, and the electric resistance becomes larger thereby. Moreover, the quality of the carbon material after the sintering deteriorates if the sintering material is not uniform. Depending upon the shape of the grooves, the separability from the mold might become difficult, making it hard to remove the carbon material after sintering from the mold.

It would be of great advantage in the art if an improved method of manufacturing a separator for an electrolyte fuel cell.

Other advantages will appear hereinafter.

SUMMARY OF THE INVENTION

It has now been discovered that the above and other objects of the present invention may be accomplished in the following manner. The present invention has firstly solved the above-mentioned problems by a method of manufacturing a separator for a polymer electrolyte fuel cell comprising the steps of: arranging a metallic plate provided with plating on the obverse and reverse sides thereof in a mold formed with grooves; charging a sintering material comprising a powder of carbon coated with phenol resin onto both sides of said metallic plate; and integrating said sintering material with said metallic plate by heating and sintering said sintering material in the atmosphere, thereby forming grooves on the surfaces.

The present invention includes a method of manufacturing a separator for a polymer electrolyte fuel cell comprising the steps of arranging a metallic plate provided with plating on the obverse and reverse sides thereof in a mold formed with grooves; charging a sintering material comprising a powder of carbon coated with phenol resin onto both sides of said metallic plate; and integrating said sintering material with said metallic plate by heating and sintering said sintering material in vacuum, thereby forming grooves on the surfaces.

The invention further includes a method of manufacturing a separator for a polymer electrolyte fuel cell comprising the steps of: preparing a mold formed with grooves; charging a sintering material comprising a powder of carbon coated with phenol resin a metal powder, and the same kind of sintering material as mentioned first into said mold in said order; and integrating said sintering materials with said metal powder by heating and sintering said sintering materials in vacuum, thereby forming grooves on the surfaces.

BRIEF DESCRIPTION OF THE DRAWINGS

For a more complete understanding of the invention, reference is hereby made to the drawings, in which.

DETAILED DESCRIPTION OF THE PREFERRED EMBODIMENT

According to the present invention, phenol resin is uniformly distributed in the sintering material, and because the lowest amount of phenol resin required as a binder has to be added, the thus manufactured separator may be homogeneous with high strength. Because the metallic plate does not oxidize when heating and sintering takes place, oxides with a low electrical conduction property are never generated on the surfaces of the separator.

The separator is manufactured by using a metallic plate with plating on the surfaces, and a sintering material which comprises a carbon powder coated with phenol resin will be explained by way of the first invention.

Figure 1:
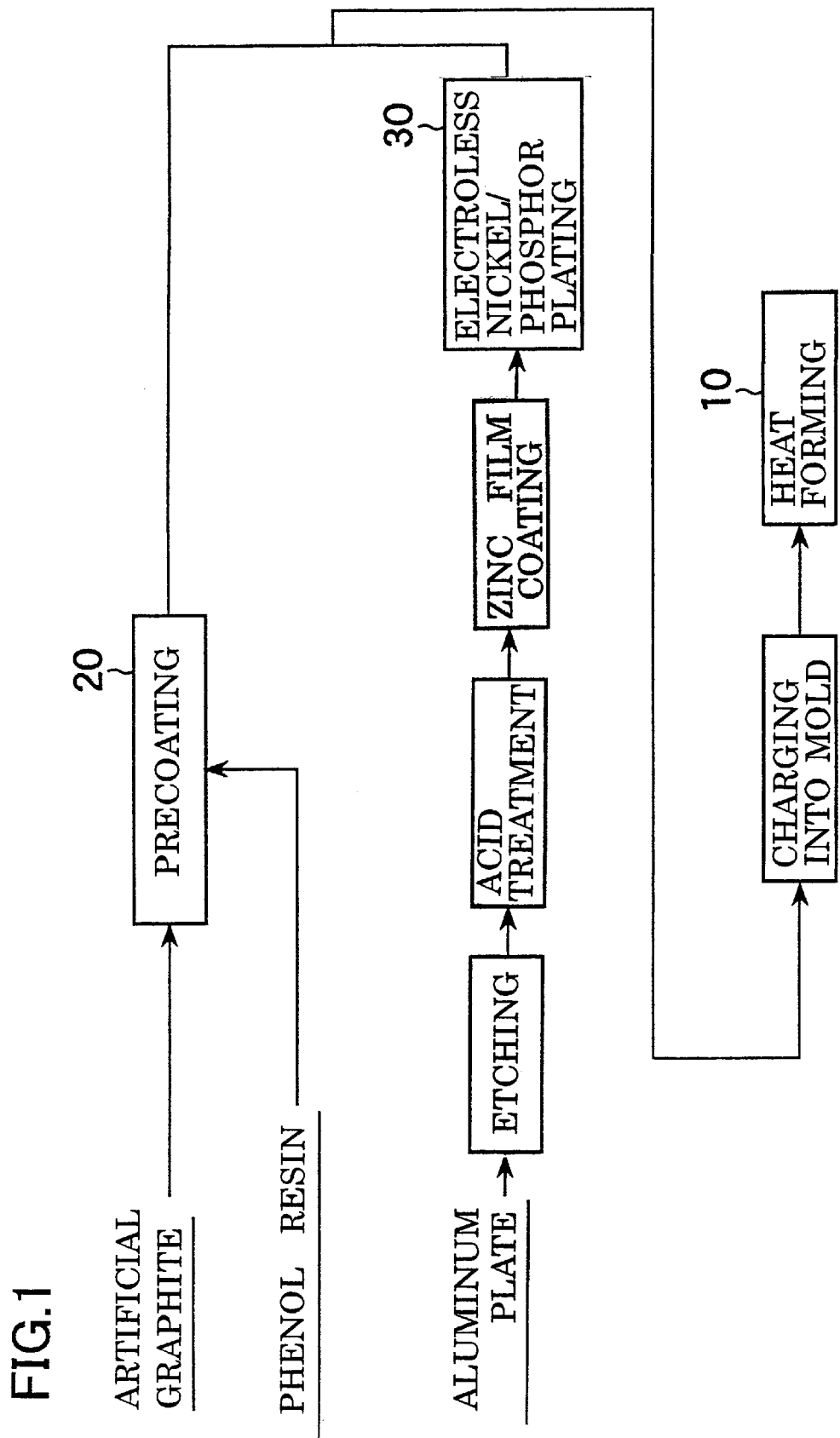
FIG. 1 is a block diagram illustrating a process of manufacturing a separator for a polymer electrolyte fuel cell by the first embodiment of the present invention.
Figure 2:
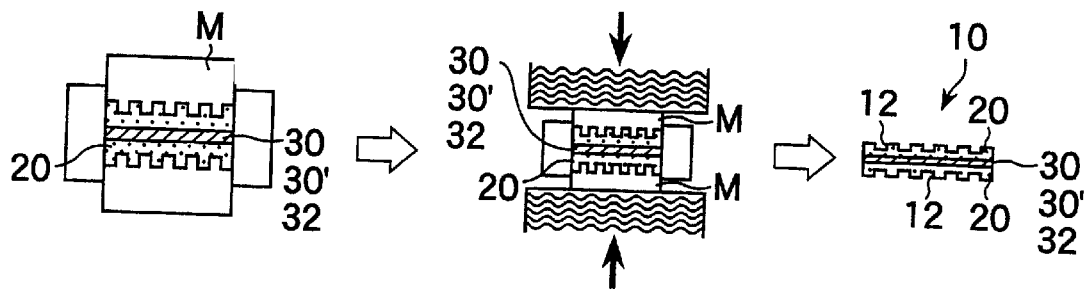
FIG. 2 is are sectional views in which the process of sintering in the method of manufacturing of FIG. 1 is shown.
Figure 3:
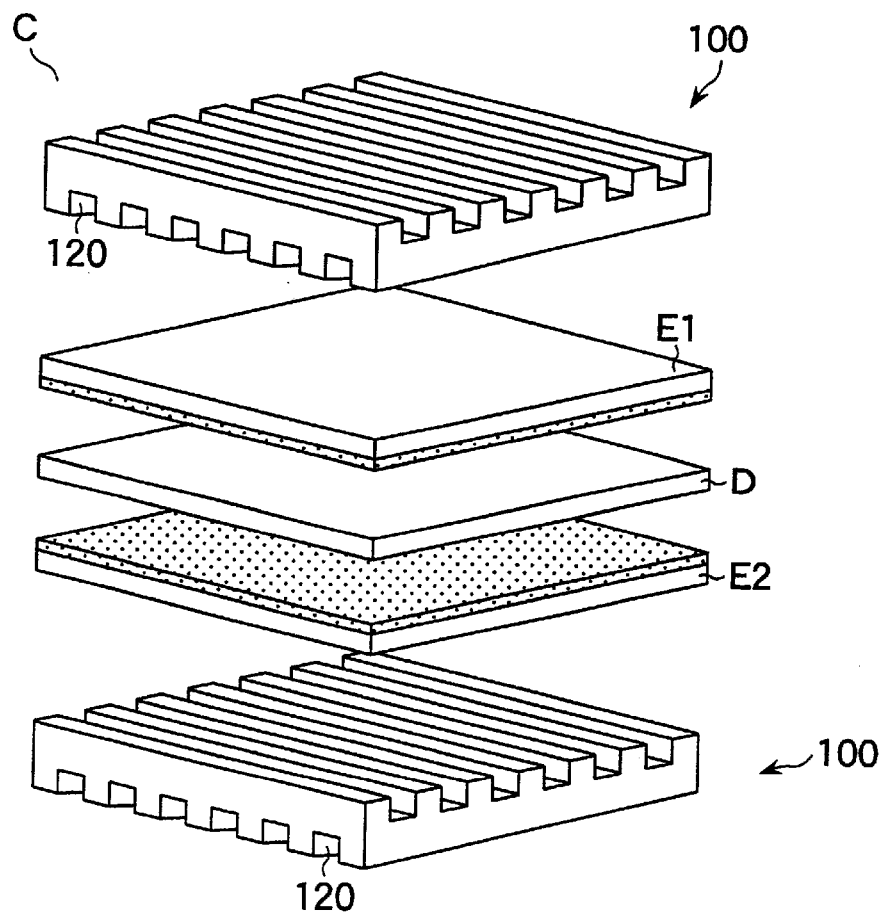
FIG. 3 is a perspective view of a cell which is a minimum unit composing a fuel cell.

FIG. 1 is a block diagram of a flow chart showing a method of manufacturing a separator by the first embodiment or aspect of the present invention. FIG. 2 is a section showing the state of heating and sintering. Firstly, a light metal (aluminum is an example) with a comparatively small specific gravity is formed into a plate; and on the obverse and reverse sides thereof, etching processing, acid treatment, and zinc film coating are performed; and thereafter, a metal which is hard to be oxidized having the coefficient of thermal expansion similar to that of carbon is plated so as to obtain a metallic plate 30.

Also, phenol resin is coated to the surface of the powder of carbon to prepare the sintering material 20. Next, the metallic plate 30 as above-mentioned is plated in a metal mold M in FIG. 2, mold which has the ruggedness in the form of the grooves, and the above-mentioned sintering material 20 is filled to both sides of the metallic plate 30, and is sintered in the atmospheric environment.

As a result, the sintering material 20 is integrated with the metallic plate 30, and grooves are formed on the surfaces. Thus, oxidization will not occur even if heated in the atmosphere because the metal not oxidized easily is plated on the surfaces of the metallic plate 30. Therefore, oxides with a low electrical conduction property are never generated on the surfaces of the thus manufactured separator 10. Owing to the sintering material 20 which comprises a powder of carbon coated with phenol resin, the need to mix the carbon powder with the granulated powder of phenol resin may be eliminated unlike the conventional sintering material, and the phenol resin may be more uniformly distributed in the sintering material compared with the conventional sintering material. Therefore, it is easy to prepare a homogeneous carbon material and the product is easy to be taken out of a mold M, and it is possible to obtain a thin separator 10. Moreover, because the phenol resin coated to the surface of the powder of carbon should be adequate as the binder, extra phenol resin need not be added.

As a result, the charging of the carbon material into the mold M increases so that the density of the carbon material after the sintering rises, thereby imparting strength to the carbon material. Also, as the generation of bubbles due to the phenol resin may decrease, the gas shielding property may be improved.

Next, a method of manufacturing a separator by using a metallic plate to which plating are not given and a sintering material which comprises a carbon powder coated with phenol resin will be explained by way of the second embodiment In this method, the same sintering material 20 is filled as the first embodiment to both sides of a metallic plate 30' which is arranged in a mold M which is provided with grooves, and this metallic plate 30' is not provided with any plating. They are sintered in vacuum. As the heating processing is done in vacuum in this particular method, the metallic plate 30' to which plating are not given on the surfaces thereof, does not oxidize at all.

Next, a third embodiment comprising a method of manufacturing a separator using the sintering material comprising a carbon powder coated with phenol resin and a metallic powder will be explained. In this method, the sintering material 20 and the metal powder 32 are filled to a mold M which is provided with grooves, and the materials are sintered in vacuum. When the sintering material 20 and the metal powder 32 are filled to the mold M, both sides of the metal powder 32 should be covered by the sintering material 20. Charging should be made in the mold M in the order of the sintering material 20, the metal powder 32, and again the sintering material 20. In this method, because the metal powder 32 melts when sintered, the same effect as that of the metallic plates 30 and 30' according to the first and second embodiments respectively are obtained. Because the heating processing is done in vacuum, metal powder 32 is not oxidized at all.

In the second and third embodiments described above, the effect of sintering material 20 which comprises the carbon powder coated with phenol resin is the same as that of the first embodiment.

In order to demonstrate the efficacy of the present invention, concrete examples are presented herein to the methods of manufacturing a separator for a fuel cell by the present invention and the separators for a fuel cell manufactured by those manufacturing methods. The metallic plates used in the following examples are metallic plates of aluminum, titanium, and magnesium of 0.3 mm with etched surfaces, treated by acid and given with zinc film coatings and processed with the prescribed plating. The thickness of the plating was 5 μm. Moreover, as the metal powders, what are available are aluminum, titanium, and magnesium treated with atomization method so as to make the mean particle diameter to be 100 μm respectively. As the sintering material what was adopted was artificial graphite particles of 75° ▯m or less coated with phenol resin.

The separators made in the following examples are the same as the one shown in FIG. 4. This separator was 100 mm in length, 100 mm in width, 2 mm in thickness, and the grooves shown in FIG. 4 within the range of 50 mm in length and 50 mm in width have been formed in the central part on the surface and the back.

The metallic plate used in example 1 was the an aluminum plate on which electroless nickel/phosphor plating was applied to the surfaces thereof. After this metallic plate was arranged in a mold, and the above mentioned sintering material was filled onto both sides of the metallic plate, it was sintered for 20 minutes under the condition of a pressure of 30 MPa, and the separator shown in FIG. 4 was made at 160° C. in the atmospheric environment.

The metallic plate used in example 2 is a plate to which nickel plating was given to the surfaces of the above-mentioned aluminum plate. The metallic plate used in example 3 is a plate to which gold plating was applied to the surface of the above-mentioned aluminum plate. The metallic plate used in example 4 is a plate to which platinum plating was applied to the surfaces of the above-mentioned aluminum plate.

The metallic plate used in example 5 is a plate to which nickel/phosphor plating was given to the surfaces of the above-mentioned titanium plate. The metallic plate used in example 6 is a plate to which nickel/phosphor plating was given to the surfaces of the above-mentioned magnesium plate.

Figure 4:
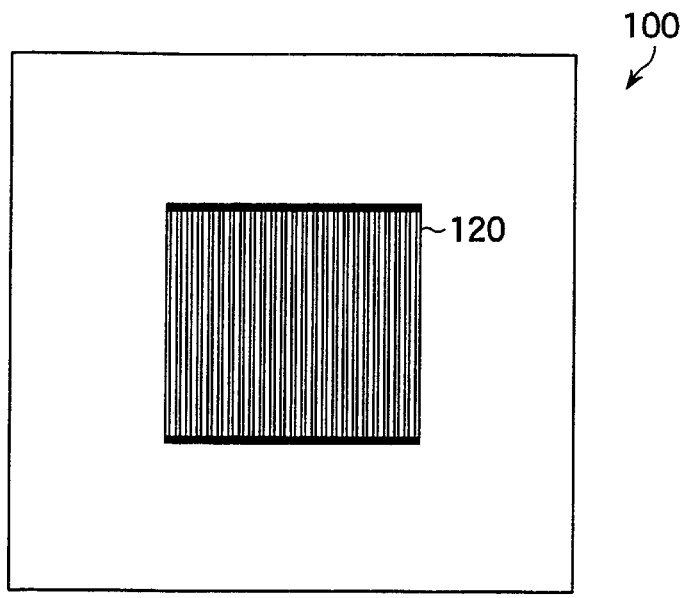
FIG. 4 is a front view of a separator used for a fuel cell.
Figure 5:
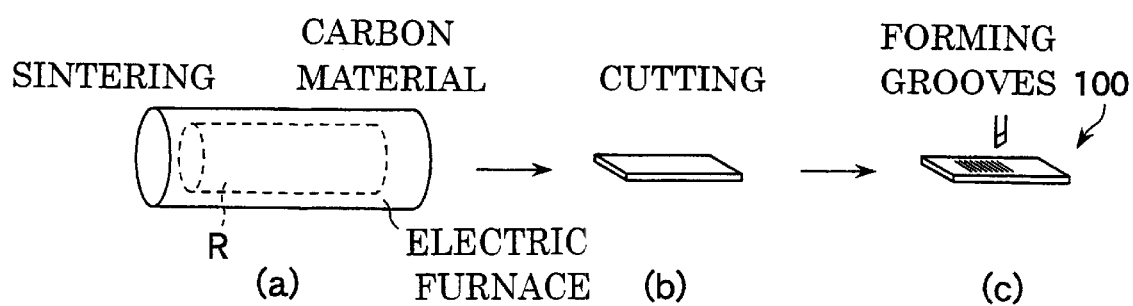
FIG. 5 is a sequence of views showing a method of manufacturing a separator using an isotropic carbon in the order of (a) (b) and (c).

In examples 2 to 6 respectively, separators shown in FIG. 4 were made under the conditions same as example 1, utilizing the above identified metallic plates and sintering material.

Next, an aluminum plate to which plating was not given was used in example 7. This metallic plate and the sintering material were arranged in a mold, and a separator of the shape shown in FIG. 4 was made by sintering in vacuum for 20 minutes by the conditions of 160° C. and a pressure of 30 MPa.

In example 8, aluminum metal powder was used as the replacement of the metallic plate. The materials were filled in the mold in the order of the sintering material, aluminum metal powder, and the sintering material, and the separator of the shape shown in FIG. 4 was made by sintering for 20 minutes in vacuum by the conditions of 160° C. and a pressure of 30 MPa.

By way of comparison, a conventional separator was made with an isotropic carbon turned into a plate of 100 mm in length, 100 mm in width, and 2 mm in thickness and formed with grooves by an end mill within the range of 50 mm in length and 50 mm in width on both sides thereof. This is a comparative example.

The specific resistance, the coefficient of thermal conductivity, the bending strength, and the gas permeability coefficient were measured of the separators from the examples 1 to 8 and the separator of the comparative example, and the measurement results are shown in Table 1.

TABLE 1

| EXAMPLE | Specific Resistance μΩ cm | Thermal Conductivity kj/m h° C. | Bending Strength MPa | Gas Permeability cc/cm sec atm |
|---|---|---|---|---|
| Example 1 | 800 | 520 | 75 | 0.2 |
| Example 2 | 750 | 540 | 70 | 0.1 |
| Example 3 | 860 | 500 | 65 | 0.2 |
| Example 4 | 920 | 480 | 60 | 0.2 |
| Example 5 | 950 | 470 | 80 | 0.1 |
| Example 6 | 830 | 500 | 77 | 0.1 |
| Example 7 | 900 | 480 | 55 | 0.1 |
| Example 8 | 750 | 500 | 70 | 0.2 |
| Comparative Example | 1000 | 460 | 50 | 1.0 |

The specific resistance depended on the physical characteristic measuring method (JISR7222) of graphite material, the coefficient of thermal conductivity depended on the laser flash method, respectively, the bending strength depended on the method of bending strength test of hard plastics, and the gas permeability coefficient was measured by the method (JISK7126) of examining the gas permeation degree of plastic films and sheets.

As shown in Table 1, the separator manufactured by the method of the present invention has the smaller specific resistance, the higher coefficient of thermal conductivity and bending strength, and the lower gas permeability coefficient compared with the conventional separator. Therefore, the electric power generated in the cell and heat can be efficiently transmitted outside when this separator is used, and the reactant gas supplied to the anode side and the cathode side is not mixed easily.

According to the method of manufacturing a separator for a polymer electrolyte fuel cell of the present invention, it is possible to uniformly distribute the phenol resin in the sintering material by coating the phenol resin as a binder to the surface of a powder of carbon. As a result, the carbon material after the sintering becomes homogeneous, and there is no need to add phenol resin in the sintering material more than necessary. Therefore, the generation of pores in the carbon material after the sintering may be decreased, and the carbon material becomes high in strength, thereby enabling to manufacture a thinner separator.

The metallic plate never oxidizes when fired with the sintering material when a metal not oxidized easily is plated on the surface of the metallic plate. Moreover, the metallic plate and the metal powder never oxidize even when the metallic plate and the metal powder to which plating is not given to the surface are used when sintered in vacuum. Therefore, oxides with a low electrical conduction property are never generated on the surfaces of the manufactured separator.

Because a separator manufactured by the method of the present inventions is of high strength, it is possible to compose a fuel cell by accumulating a large number of cells. Moreover, because the specific resistance is small, the electric power generated in the cell can be efficiently transmitted outside. In addition, the reactant gas supplied to the anode side and the cathode side is not mixed easily, because it is excellent in the gas shielding property. Moreover, heat generated in the cell can radiate efficiently as the coefficient of thermal conductivity is high.

While particular embodiments of the present invention have been illustrated and described, it is not intended to limit the invention to any specific embodiment The essence of this invention is the use of a plurality of kinds of fibers in a braided form to form a non corrosive reinforcement bar in concrete civil engineering structures. The description of the invention is not intended to limit the invention, except as defined by the following claims.

What is claimed is:

1. A method of manufacturing a separator for a polymer electrolyte fuel cell comprising the steps of:

arranging a metallic plate provided with plating on the obverse and reverse sides thereof in a mold formed with grooves;

charging a sintering material comprising a powder of carbon coated with phenol resin onto both sides of said metallic plate; and integrating said sintering material with said metallic plate by heating and sintering said sintering material in the atmosphere, thereby forming grooves on the surfaces.

2. A method of manufacturing a separator for a polymer electrolyte fuel cell of claim 1, wherein said metallic plate comprises a plate made from a metal selected from the group consisting of aluminum, magnesium, titanium, and an alloy selected from aluminum, magnesium and titanium.

3. A method of manufacturing a separator for a polymer electrolyte fuel cell of claim 2, wherein said metallic plate includes a plating selected from the group consisting of nickel/phosphor, nickel, gold and platinum.

4. A method of manufacturing a separator for a polymer electrolyte fuel cell comprising the steps of:

arranging a metallic plate provided with plating on the obverse and reverse sides thereof in a mold formed with grooves;

charging a sintering material comprising a powder of carbon coated with phenol resin onto both sides of said metallic plate;

and integrating said sintering material with said metallic plate by heating and sintering said sintering material in vacuum, thereby forming grooves on the surfaces.

5. A method of manufacturing a separator for a polymer electrolyte fuel cell of claim 4, wherein said metallic plate is made from a metal selected from the group consisting of aluminum, magnesium, titanium, and an alloy selected from aluminum, magnesium and titanium.

6. A method of manufacturing a separator for a polymer electrolyte fuel cell of claim 5, wherein said metallic plate includes a plating selected from the group consisting of nickel/phosphor, nickel, gold and platinum.

7. A method of manufacturing a separator for a polymer electrolyte fuel cell comprising the steps of:

preparing a mold formed with grooves;

charging a sintering material comprising a powder of carbon coated with phenol resin, a metal powder, and followed by additional said sintering material as mentioned above into said mold in said order; and integrating said sintering materials with said metal powder by heating and sintering said sintering materials in vacuum, thereby forming grooves on the surfaces.

8. A method of manufacturing a separator for a polymer electrolyte fuel cell of claim 7, wherein said metallic powder is selected from the group consisting of aluminum, magnesium, titanium, and an alloy selected from aluminum, magnesium and titanium alloys.

* * * * *